US012749364B2

(12) United States Patent
Otsuki et al.

(10) Patent No.: US 12,749,364 B2
(45) Date of Patent: Sep. 29, 2026

(54) AUTHENTICATION SYSTEM AND AUTHENTICATION METHOD

(71) Applicant: TOYOTA JIDOSHA KABUSHIKI KAISHA, Aichi-ken (JP)

(72) Inventors: Nobuhisa Otsuki, Tokyo-to (JP); Hideo Hasegawa, Nagoya (JP); Yusuke Kida, Tokyo-to (JP); Daichi Yamashita, Nishitokyo (JP); Kenta Takeshima, Tokyo-to (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/744,703

(22) Filed: Jun. 17, 2024

(65) Prior Publication Data

US 2024/0428635 A1 Dec. 26, 2024

(30) Foreign Application Priority Data

Jun. 21, 2023 (JP) ................................ 2023-102026

(51) Int. Cl.
*G07C 9/22* (2020.01)
*G07C 9/27* (2020.01)

(52) U.S. Cl.
CPC .................................... *G07C 9/22* (2020.01)

(58) Field of Classification Search
CPC ........................................................ G07C 9/22
See application file for complete search history.

(56) References Cited

U.S. PATENT DOCUMENTS

| | | | | |
|---|---|---|---|---|
| 9,397,980 B1 * | 7/2016 | Chen | G06F 21/33 | |
| 9,990,786 B1 * | 6/2018 | Ziraknejad | G06F 21/45 | |
| 2003/0132830 A1 * | 7/2003 | Dow | H04N 7/186 | 348/143 |
| 2012/0321084 A1 * | 12/2012 | Le Saint | H04L 9/3247 | 380/277 |
| 2013/0173642 A1 * | 7/2013 | Oliver | G06F 40/20 | 707/756 |
| 2014/0282929 A1 * | 9/2014 | Tse | G07C 9/00309 | 726/5 |

(Continued)

FOREIGN PATENT DOCUMENTS

| | | |
|---|---|---|
| JP | 2020-024511 A | 2/2020 |
| JP | 2021-124775 A | 8/2021 |
| JP | 2023-513890 A | 4/2023 |

*Primary Examiner* — Davetta W Goins
*Assistant Examiner* — Pameshanand Mahase
(74) *Attorney, Agent, or Firm* — HAUPTMAN HAM, LLP

(57) ABSTRACT

An authentication system is configured to authenticate a user for entering a specific area or using a specific service provided in the specific area. One or more processors of the authentication system are configured to execute: a consent confirmation process of accepting consent from the user to one or more consent matters, which are needed in the specific area or when using the specific service; an update process of updating the consent status depending on whether or not there is the consent; and an authentication process of permitting the user to enter the specific area or to use the specific service on condition that there is the consent. The consent confirmation process includes a detection process of detecting exit of the user from the specific area, and a withdrawal confirmation process of accepting a withdrawal of the consent from the user at a time of the exit.

16 Claims, 4 Drawing Sheets

(56) References Cited

U.S. PATENT DOCUMENTS

| | | | |
|---|---|---|---|
| 2020/0042727 | A1 | 2/2020 | Ogura et al. |
| 2022/0191200 | A1 * | 6/2022 | Tulshibagwale ........ H04L 63/08 |
| 2023/0343435 | A1 | 10/2023 | Wren et al. |

* cited by examiner

AUTHENTICATION SYSTEM AND AUTHENTICATION METHOD

CROSS-REFERENCES TO RELATED APPLICATION

The present disclosure claims priority under 35 U.S.C. § 119 to Japanese Patent Application No. 2023-102026, filed on Jun. 21, 2023, which is incorporated herein by reference in its entirety.

BACKGROUND

Technical Field

The present disclosure relates to a technique for authenticating a user for entering a specific area or using a specific service provided in the specific area.

Background Art

JP 2021-124775 A discloses an information processing device. The information processing device acquires permission information from each service included in a predetermined cooperative service composed of a plurality of services. The permission information indicates whether or not permission to acquire information is given. Then, prior to execution of the cooperative service, the information processing device uses the acquired permission information to perform a process of presenting a screen for collectively setting consent to the information acquisition from each service. More specifically, when executing the cooperative service that has been executed once for the second time or later, the information processing device acquires information of each service, without presenting the screen, in accordance with the setting at the time of the first execution of the cooperative service.

SUMMARY

When entering a specific area or using a specific service provided in the specific area, a user may be asked by an authentication system to agree to one or more consent matters, which are needed in the specific area or when using the specific service. However, the contents of the one ore more consent matters are not always the same, and may change after the user leaves the specific area. As a result, the actual consent matters may differ from the consent matters recognized by the user. If the user later realizes that consent different from the user's own recognition has been made without the user's knowledge, the user may feel distrustful or unfair about future consent.

The present disclosure has been made in view of the problem described above, and an object thereof is to provide an authentication system and an authentication method that can reduce a user's sense of distrust or unfairness regarding future consent.

An authentication system according to the present disclosure is configured to authenticate a user for entering a specific area or using a specific service provided in the specific area. The authentication system includes one or more memory devices, one or more processors, and a communication terminal. The one or more memory devices is configured to store a consent status of the user for one or more consent matters, which are needed in the specific area or when using the specific service. The communication terminal is operated by the user. The one or more processors are configured to execute: a consent confirmation process of accepting consent to the one or more consent matters from the user via the communication terminal; an update process of updating the consent status depending on whether or not there is the consent; and an authentication process of permitting the user to enter the specific area or to use the specific service on condition that there is the consent. The consent confirmation process includes a detection process of detecting exit of the user from the specific area, and a withdrawal confirmation process of accepting a withdrawal of the consent from the user via the communication terminal at a time of the exit.

An authentication method according to the present disclosure authenticates a user by a computer with respect to entering a specific area or using a specific service provided in the specific area. The computer is configured to access one or more memory devices configured to store a consent status of the user for one or more consent matters, which are needed in the specific area or when using the specific service. The authentication method, which is executed by the computer, includes: a consent confirmation process of accepting consent to the one or more consent matters from the user via the communication terminal operated by the user; an update process of updating the consent status depending on whether or not there is the consent; and an authentication process of permitting the user to enter the specific area or to use the specific service on condition that there is the consent. The consent confirmation process includes: a detection process of detecting exit of the user from the specific area; and a withdrawal confirmation process of accepting a withdrawal of the consent from the user via the communication terminal at a time of the exit.

According to the present disclosure, when the user exits the specific area, the user can be requested to confirm that the consent continues. This can reduce a user's sense of distrust or unfairness regarding future consent.

DETAILED DESCRIPTION

An authentication system 1 and an authentication method according to embodiments of the present disclosure will be described with reference to the accompanying drawings.

1. Configuration of Authentication System

Figure 1:
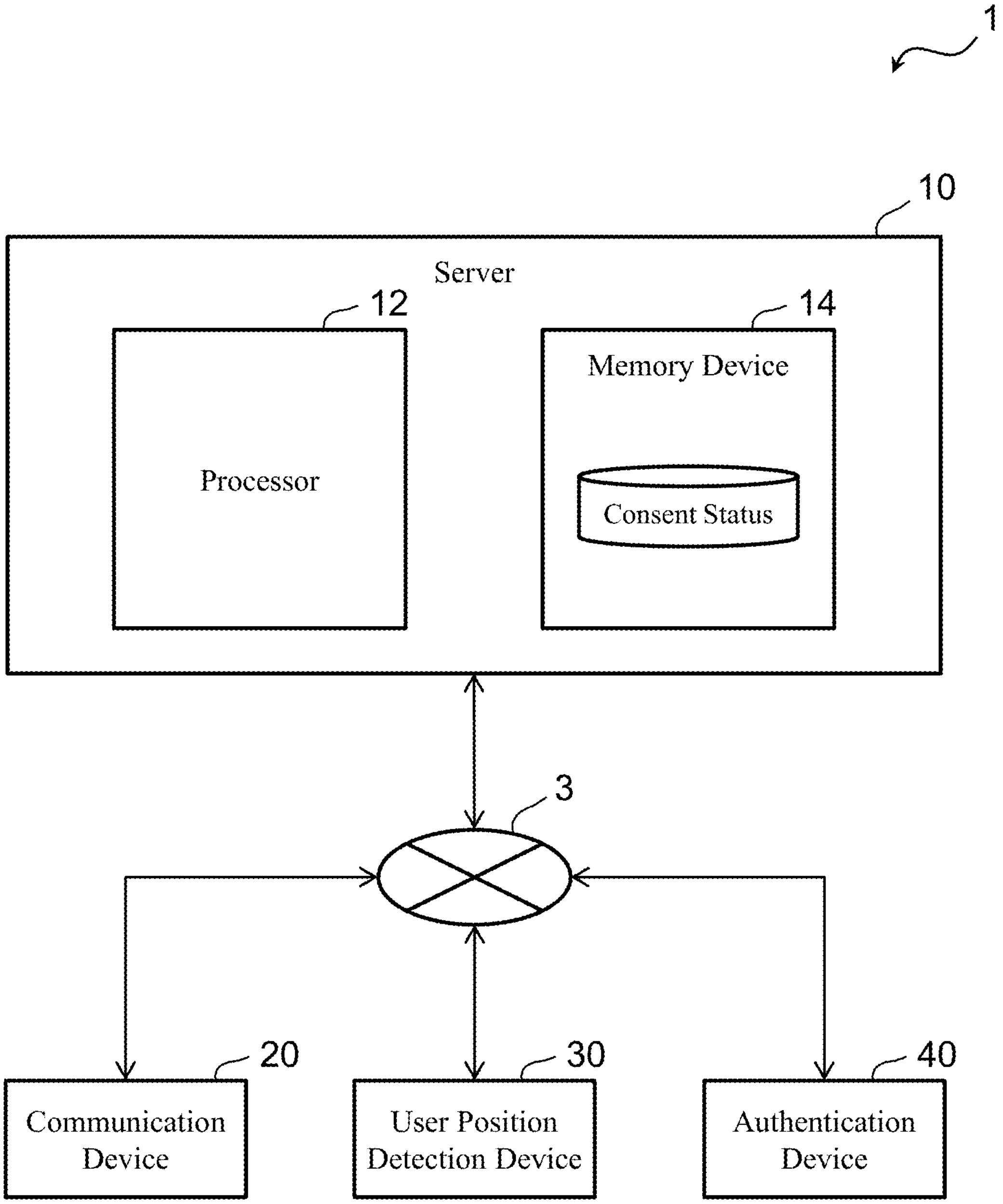
FIG. 1 is a diagram schematically illustrating an example of a configuration of an authentication system according to an embodiment.
Figure 2:
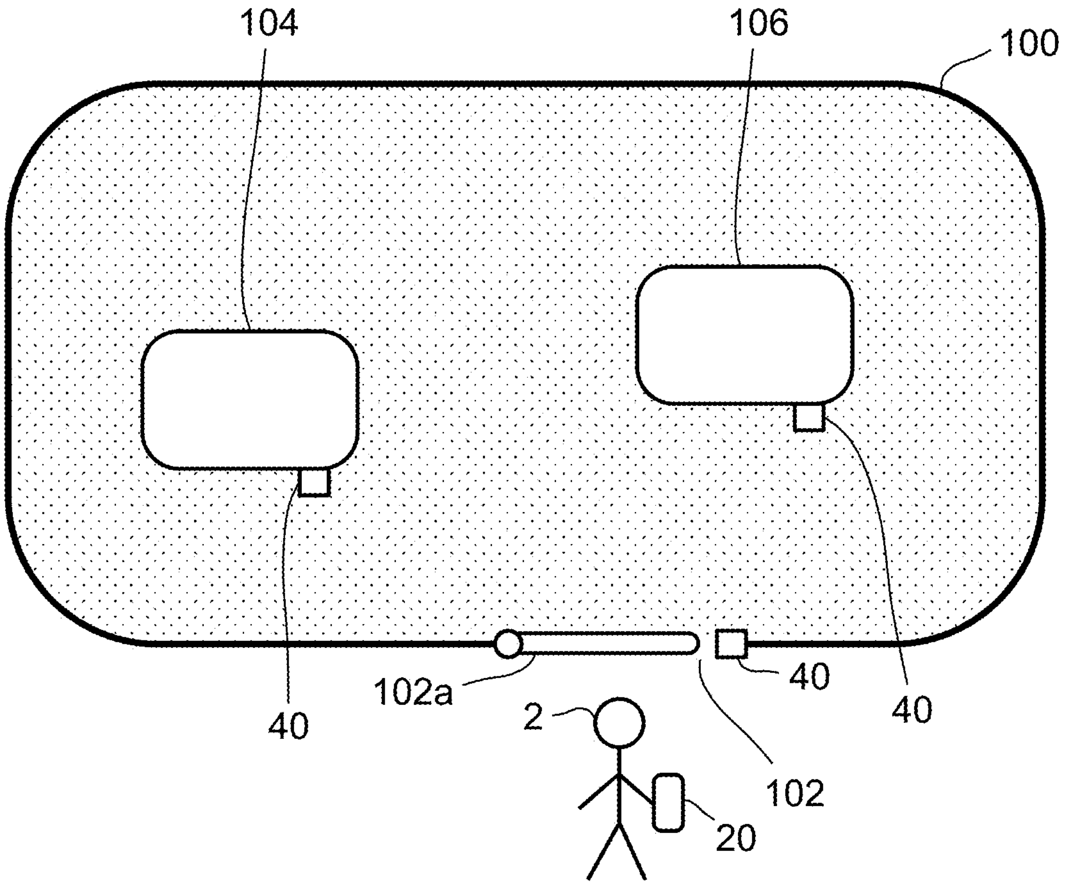
FIG. 2 is a diagram used to describe a specific area in which user authentication is performed by the authentication system shown in FIG. 1.

FIG. 1 is a diagram schematically illustrating an example of a configuration of an authentication system 1 according to an embodiment. FIG. 2 is a diagram used to describe a specific area 100 in which user authentication is performed by the authentication system 1 shown in FIG. 1.

The authentication system 1 is configured to perform user authentication for entering the specific area 100 or using a specific service S provided in the specific area 100. The specific area 100 is, for example, an event site, an art gallery, a museum, a specific region, or a city. The city is, for example, a smart city. The specific service S is, for example, operation of an exhibit, activity, or trying on clothes.

The authentication system 1 includes, for example, a server 10, a communication terminal 20, a user position detection device 30, and an authentication device 40.

The server 10 is a computer including one or more processors 12 (hereinafter, simply referred to as a "processor 12" or "processing circuitry") and one or more memory devices 14 (hereinafter, simply referred to as a "memory device 14"), and is configured on the Internet, for example. The server 10 is connected to each of the communication terminal 20, the user position detection device 30, and the authentication device 40 via a communication network 3. Therefore, the server 10 can transmit information to and from each of the user position detection device 30 and the authentication device 40.

The processor 12 executes various processes relating to the user authentication, which will be described below. The memory device 14 stores various kinds of information related to the various processes. The various kinds of information include a computer program executed by the processor 12. The processor 12 executes the computer program, and thus the various processes by the processor 12 are realized. Also, the various kinds of information include a database of information related to the authentication of each user (for example, a user 2). The information in the database includes personal information that identifies each user who uses the specific area 100, and a "consent status CS" of each user. The consent status CS is information indicating a status of consent (i.e., presence or absence of consent) of a user with respect to "consent matters CM" described below which is needed in the specific area 100 or when the specific service S is used. More specifically, the consent status CS is stored for each user in association with the personal information that identifies each user.

The communication terminal 20 is operated by the user 2. For example, the communication terminal 20 is a mobile terminal such as a smartphone carried by the user 2. A designated application related to the user authentication according to the present embodiment is installed in the communication terminal 20. Alternatively, the communication terminal 20 may be, for example, a fixed terminal installed at a gateway 102 of the specific area 100 or installed at a location where the specific service S is provided (for example, locations 104 and 106).

More specifically, the communication terminal 20 includes an input unit that accepts an operation of the user 2 and an output unit (i.e., a display unit) that displays information to the user 2. The operation of the user 2 accepted by the input unit includes an operation of the user 2 for indicating the presence or absence of the consent with respect to the consent matters CM.

The user position detection device 30 is configured to detect the position of the user 2, and includes, for example, a global navigation satellite system (GNSS) receiver. The user position detection device 30 can detect the position of the user 2 with respect to at least the specific area 100.

The authentication device 40 operates in response to a command from the server 10 (processor 12) that executes an "authentication process PR3" described below, and acquires user information Iu for identifying the user 2 subject to the authentication. The authentication device 40 includes devices necessary for the authentication using a designated authentication method. The designated authentication method may be, for example, authentication of a fingerprint or a face of the user 2, or authentication of an integrated circuit (IC) card carried by the user 2. As shown in FIG. 2, the authentication device 40 is installed at the gateway 102 of the specific area 100. The authentication device 40 is also installed at each of the locations 104 and 106 where the specific service S is provided in the specific area 100.

The communication terminal 20, the user position detection device 30, and the authentication device 40 described above may be configured as follows, for example. That is, the user position detection device 30 may be integrally configured with the communication terminal 20, and therefore, the server 10 may acquire the position information of the user 2 from the communication terminal 20. Moreover, in an example in which the communication terminal 20 is a fixed terminal, the communication terminal 20 may be integrally configured with the authentication device 40. Further, the authentication device 40 may be configured integrally with a device that operates in accordance with whether or not the user 2 can enter the specific area 100 (for example, a bar 102*a* installed at the gateway 102). Similarly, the authentication device 40 may be configured integrally with a device that operates in accordance with whether or not the user 2 can use the specific service S (for example, a device that turns on and off the service providing device).

2. Various Processes Related to User Authentication

The user 2 is requested to agree to designated "consent matters CM" in the specific area 100 or when using the specific service S. The consent matters CM relate to, for example, collection of data, use of collected data, prohibition of photography, prohibition of touching exhibits, compliance with regulations (for example, Food Sanitation Law), and understanding of policies (for example, purpose of an event).

The various processes executed by the processor 12 in the authentication system 1 include a "consent confirmation process PR1", an "update process PR2", and an "authentication process PR3".

In the consent confirmation process PR1, the processor 12 accepts consent to the consent matters CM from the user 2 via the communication terminal 20. In the update process PR2, the processor 12 updates the consent status CS depending on whether or not there is the consent of the user 2. In the authentication process PR3, the processor 12 permits the user 2 to enter the specific area 100 or to use the specific service S on condition that there is the consent (i.e., on condition that the user 2 agrees to the consent matters CM).

The contents of the consent matters CM are not always the same, and may change after the user 2 leaves the specific area 100. As a result, the actual consent matters CM may differ from the consent matters CM recognized by the user 2. For example, when the specific area 100 is a space where the user 2 always lives, such as a city, it is assumed that the actual consent matters CM may gradually differ from the recognition of the user 2. If the user later realizes that consent different from the user's own recognition has been made without the user's knowledge, the user may feel distrustful or unfair about future consent.

In view of the issue described above, the consent confirmation process PR1 according to the present embodiment includes the following "detection process PR11" and "withdrawal confirmation process PR12". In the detection process PR11, the processor 12 detects the exit of the user 2 from the specific area 100. In the withdrawal confirmation process PR12, the processor 12 accepts a withdrawal of the consent from the user 2 via the communication terminal 20 at the time of the exit.

Figure 3:
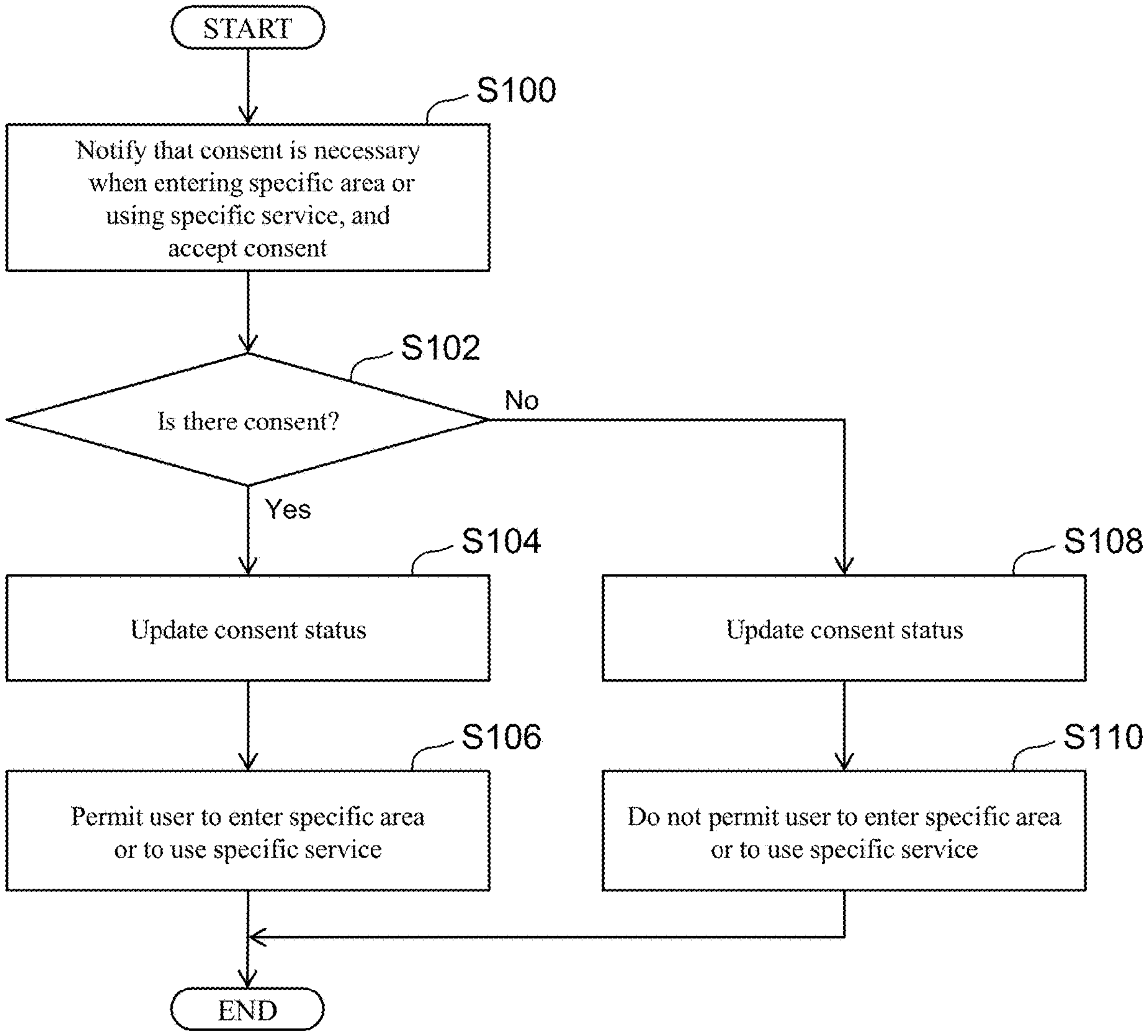
FIG. 3 is a flowchart illustrating an example of a flow of processing related to the user authentication according to an embodiment.

FIG. 3 is a flowchart illustrating an example of a flow of processing related to the user authentication according to the embodiment. For example, when the user position detection device 30 detects that the user 2 is at the gateway 102 of the specific area 100 or at a location where the specific service S is provided in the specific area 100, the processor 12 executes the processing of this flowchart. Alternatively, the processing of the flowchart may be executed when, for example, the server 10 receives, via the communication terminal 20 or the authentication device 40, a request from the user 2 for entering the specific area 100 or using the specific service S.

In step S100 (consent confirmation process PR1), the processor 12 notifies the communication terminal 20 that consent to the consent matters CM is necessary when entering the specific area 100 or using the specific service S. Then, the processor 12 accepts the consent from the user 2 via the communication terminal 20. Further, the processor 12 identifies the user 2 subject to the authentication using the authentication device 40.

The communication terminal 20 displays, on the output unit, a notification received from the server 10. When the user 2 operates the communication terminal 20 to make a reply regarding whether or not there is the consent, the communication terminal 20 transmits, to the server 10, information Ic indicating the presence or absence of the consent. When the server 10 receives the information Ic from the communication terminal 20 and receives user information Iu for identifying the user 2 from the authentication device 40, the processing proceeds to step S102.

In step S102, the processor 12 determines, based on the information Ic and the user information Iu, whether or not there is the consent of the identified user 2. As a result, when there is the consent (step S102; Yes), the processing proceeds to step S104. When, on the other hand, there is no consent (step S102; No), the processing proceeds to step S108.

In step S104 (update process PR2), the processor 12 updates the consent status CS to indicate that "the consent is present". The updated consent status CS is stored in the memory device 14. It should be noted that the update mentioned here includes maintaining the state of "the consent is present" based on the past update. Then, in step S106, the processor 12 permits the user 2 to enter the specific area 100 or to use the specific service S, for which the consent is currently requested (authentication process PR3). As a result, for example, the gateway 102 of the specific area 100 is opened.

In step S108 (update process PR2), the processor 12 updates the consent status CS to indicate that "the consent is absent". The updated consent status CS is stored in the memory device 14. It should be noted that the update mentioned here includes maintaining the state of "the consent is absent" based on the past update. Then, in step S110, the processor 12 does not permit the user 2 to enter the specific area 100 or use the specific service S, for which the consent is currently requested (authentication processing PR3). As a result, for example, the gateway 102 is not opened.

It should be noted that, if the consent in the consent confirmation process PR1 performed in the past for the same user 2 is valid (that is, if the user 2 did not withdraw the consent (see FIG. 4) when exiting the specific area 100 in the past), the processing of step S100 may be simplified as follows. That is, only the process of identifying the user 2 using the authentication device 40 may be executed.

Figure 4:
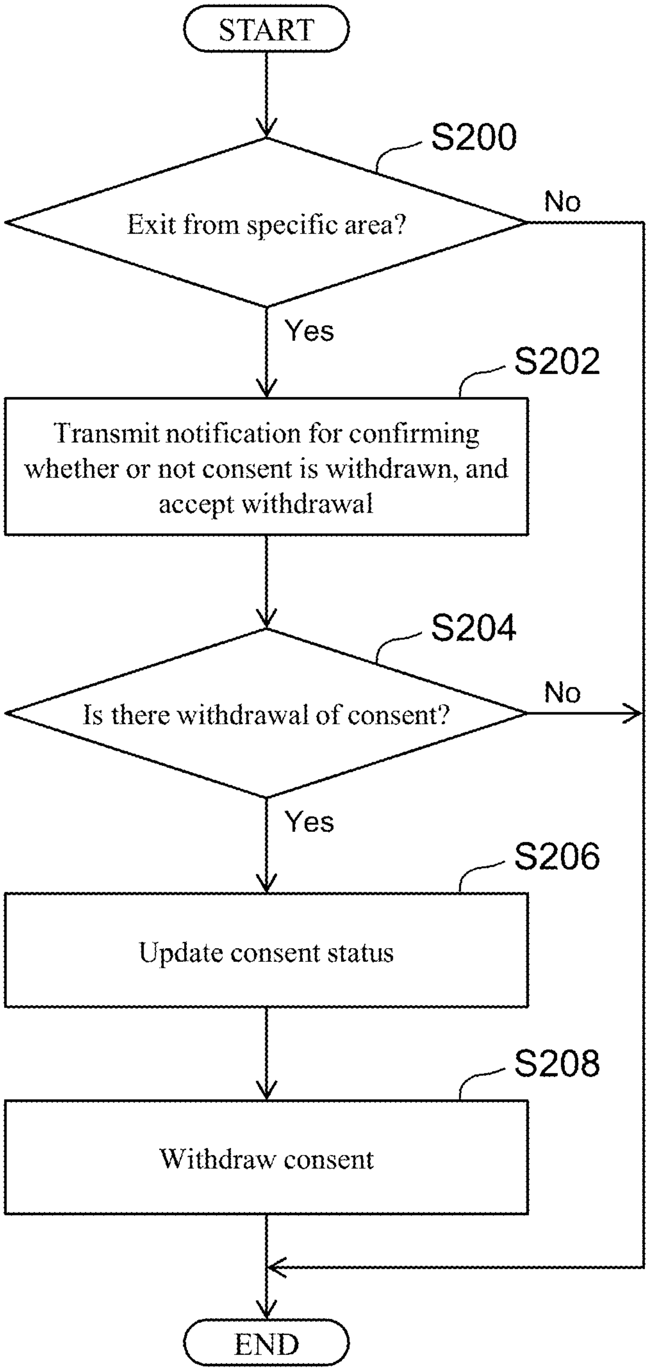
FIG. 4 is a flowchart illustrating an example of a flow of a consent confirmation process executed when a user exits a specific area.

FIG. 4 is a flowchart illustrating an example of a flow of the consent confirmation process PR1 executed when the user 2 exits the specific area 100. The processing of this flowchart is executed in parallel with the processing shown in FIG. 3.

In step S200 (detection process PR11), the processor 12 determines whether or not the user 2 who is a target of the processing illustrated in FIG. 3 has exited from the specific area 100. To be specific, in the detection process PR11, the processor 12 detects that the user 2 has exited from the specific area 100 by confirming that the user 2 has moved out of the specific area 100 based on information from the user position detection device 30, for example. However, in the detection process PR11, instead of the exit of the user 2 from the specific area 100, the processor 12 may detect that the user 2 is about to exit from the specific area 100 when the user 2 is in the specific area 100. For example, when the processor 12 confirms that the user 2 is near the gateway 102 based on the information from the user position detection device 30 or information from the authentication device 40 installed at the gateway 102 and receives a request for the exit from the user 2 via the communication terminal 20 or the authentication device 40, the processor 12 may detect the exit of the user 2.

When the user 2 has not exited the specific area 100 (step S200; No), the processing proceeds to "END". On the other hand, when the user 2 exits from the specific area 100 (step S200; Yes), the processing proceeds to step S202 (withdrawal confirmation process PR12). As a result, when the user 2 exits, the processor 12 transmits, to the communication terminal 20, a notification for confirming whether or not the consent is withdrawn. Then, the processor 12 accepts a withdrawal of the consent from the user 2 via the communication terminal 20. Also, the processor 12 using the authentication device 40 to identify the user 2 subject to the authentication at the time of the exit. In addition, when the user 2 has made a plurality of consents at the time of entering the specific area 100 and using the specific service S, the processing in step S202 and subsequent steps regarding the withdrawal of the consent may be performed for each consent or may be performed collectively for all consents.

When the user 2 operates the communication terminal 20 regarding whether or not the consent is withdrawn, the communication terminal 20 transmits, to the server 10, information Iw indicating whether or not the consent is withdrawn. When the server 10 receives the information Iw from the communication terminal 20 and receives the user information Iu for identifying the user 2 from the authentication device 40, the processing proceeds to step S204.

In step S204, the processor 12 determines whether or not the identified user 2 withdraws the consent based on the information Iw and the user information Iu. As a result, when the user 2 does not withdraw the consent (step S204; No), the processing proceeds to "END". On the other hand, when the user 2 withdraws the consent (step S204; Yes), the processing proceeds to step S206.

In step S206 (update process PR2), in response to the withdrawal request from the user 2, the processor 12 updates the consent status CS of the consent subject to the withdrawal such that the consent status CS indicates the state of "no consent". The updated consent status CS is stored in the memory device 14.

Then, in step S208, the processor 12 executes a process of withdrawing the consent subject to the withdrawal. To be specific, the processor 12 executes a process of invalidating the consent in conjunction with the exit (in other words, immediately upon the exit), for example.

Alternatively, in step S208, the processor 12 may execute a process of invalidating the consent after a designated time period T has elapsed from the exit. The designated time period T is not particularly limited, and may be set in days, weeks, or months, for example. Further, whether or not to set the designated time period T for invalidating the consent and the length of the designated time period T may be selectable by the user 2 who desires to withdraw the consent. The processor 12 may transmit, to the communication terminal 20, a notification for requesting the user 2 to make the selection. It should be noted that, when the invalidation of the consent is completed, the server 10 may transmit, to the communication terminal 20, a notification indicating the completion of the invalidation.

3. Effect

As described above, according to the present embodiment, when the user 2 exits the specific area 100, the withdrawal confirmation process PR12 is executed to accept a withdrawal of the consent from the user 2 via the communication terminal 20. That is, the user 2 can be requested to confirm that the consent continues when the user 2 exits. This can reduce the sense of distrust or unfairness felt by the user 2 regarding future consent.

In addition, the example in which the process of immediately invalidating the consent is executed in conjunction with the exit when the withdrawal of the consent is accepted is useful for the user who is anxious about the fact that consent different from the user's own recognition may be made without the user's knowledge.

The frequency of use of the specific area 100 itself or the specific service S may vary depending on the user. Therefore, it may be troublesome for a user who is scheduled to come to the specific area 100 again in the near future to be required to agree every time the user uses the specific area 100. In this regard, according to the example in which the process of invalidating the consent is executed after the designated time period T has elapsed from the exit, it is possible to reduce the sense of distrust or unfairness felt by the user 2 regarding future consent while considering the convenience of the user.

What is claimed is:

1. An authentication system configured to authenticate a user for entering a specific area or using a specific service provided in the specific area, the authentication system comprising:
- one or more memory devices configured to store a consent status of the user for one or more consent matters, which are needed in the specific area or when using the specific service;
- one or more processors; and
- a communication terminal operated by the user, wherein
- the one or more processors are configured to execute:
  - a consent confirmation process of accepting consent to the one or more consent matters from the user via the communication terminal;
  - an update process of updating the consent status depending on whether or not there is the consent; and
  - an authentication process of permitting the user to enter the specific area or to use the specific service on condition that there is the consent, and
- the consent confirmation process includes:
  - a detection process of detecting exit of the user from the specific area; and
  - a withdrawal confirmation process of accepting a withdrawal of the consent from the user via the communication terminal at a time of the exit.

2. The authentication system according to claim 1, wherein
- when accepting the withdrawal in the withdrawal confirmation process, the one or more processors execute a process of invalidating the consent in conjunction with the exit.

3. The authentication system according to claim 1, wherein
- when accepting the withdrawal in the withdrawal confirmation process, the one or more processors execute a process of invalidating the consent after a designated period of time has elapsed from the exit.

4. The authentication system according to claim 3, wherein the one or more processors are configured to transmit, to the communication terminal, a notification for requesting the user to select the designated period of time for invalidating the consent.

5. The authentication system according to claim 1, wherein the one or more consent matters include collection of user data, use of the collected user data, prohibition of photography, prohibition of touching exhibits, compliance with regulations, or understanding of policies.

6. The authentication system according to claim 1, wherein the one or more consent matters include agreement by the user to refrain from a prohibited action.

7. The authentication system according to claim 1, wherein the withdrawal of the consent comprises withdrawal of an agreement by the user to refrain from a prohibited action.

8. The authentication system according to claim 1, wherein in the detection process, the one or more processors detect exit of the user from the specific area based on position information indicating a position of the user with respect to the specific area.

9. The authentication system according to claim 1, wherein in the withdrawal confirmation process, the one or more processors transmit, to the communication terminal, a notification for confirming whether or not the consent is withdrawn.

10. An authentication method of authenticating a user by a computer with respect to entering a specific area or using a specific service provided in the specific area, wherein the computer is configured to access one or more memory devices configured to store a consent status of the user for one or more consent matters, which are needed in the specific area or when using the specific service,
- the authentication method, which is executed by the computer, comprising:
  - a consent confirmation process of accepting consent to the one or more consent matters from the user via the communication terminal operated by the user;
  - an update process of updating the consent status depending on whether or not there is the consent; and
  - an authentication process of permitting the user to enter the specific area or to use the specific service on condition that there is the consent, and
  - the consent confirmation process includes:
    - a detection process of detecting exit of the user from the specific area; and
    - a withdrawal confirmation process of accepting a withdrawal of the consent from the user via the communication terminal at a time of the exit.

11. The authentication method according to claim 10, wherein the one or more consent matters include collection of user data, use of the collected user data, prohibition of photography, prohibition of touching exhibits, compliance with regulations, or understanding of policies.

12. The authentication method according to claim 10, wherein the one or more consent matters include agreement by the user to refrain from a prohibited action.

13. The authentication method according to claim 10, wherein the withdrawal of the consent comprises withdrawal of an agreement by the user to refrain from a prohibited action.

14. The authentication method according to claim 10, wherein in the detection process, the computer detects exit of the user from the specific area based on position information indicating a position of the user with respect to the specific area.

15. The authentication method according to claim 10, wherein in the withdrawal confirmation process, the computer transmits, to the communication terminal, a notification for confirming whether or not the consent is withdrawn.

16. The authentication method according to claim 10, wherein when accepting the withdrawal in the withdrawal confirmation process, the computer executes a process of invalidating the consent after a designated period of time has elapsed from the exit, and the computer transmits, to the communication terminal, a notification for requesting the user to select the designated period of time for invalidating the consent.

* * * * *